United States Patent

[11] 3,525,377

| [72] | Inventors | Hans Menell<br>Ahlem, Germany;<br>Günter Johannes, Hannover-<br>Herrenhausen, Germany |
|---|---|---|
| [21] | Appl. No. | 706,016 |
| [22] | Filed | Feb. 16, 1968 |
| [45] | Patented | Aug. 25, 1970 |
| [73] | Assignee | Continental Gummi-Werke<br>Aktiengesellschaft<br>Hannover, Germany |
| [32] | Priority | Feb. 17, 1967 |
| [33] | | Germany |
| [31] | | C 41,532 |

[54] PNEUMATIC VEHICLE TIRE
8 Claims, 6 Drawing Figs.

[52] U.S. Cl. .................................................... 152/361,
152/356
[51] Int. Cl. ...................................................... B60c 5/00,
B60c 9/00, B60c 11/00
[50] Field of Search .......................................... 152/362,
361, 356, 354

[56] References Cited
UNITED STATES PATENTS
3,052,275  9/1962  Hylbert................... 152/362X
3,414,447  12/1968  Travers....................... 152/356X

*Primary Examiner*— George T. Hall
*Attorney*— Walter Becker

ABSTRACT: A pneumatic vehicle tire having at least one group of two reinforcing insert layers in superimposed relationship to each other and comprising strength carrying means in the form of parallel thread means extending from bead core to bead core through the side walls of the tire and the tread strip zone radially inwardly of the tread strip while those portions of said thread means which are located in said side walls extend at an approximately right angle to the circumferential direction of the tire, whereas those portions of said thread means which are located within said tread strip zone form an acute angle with the circumferential direction of said tire, and a plurality of zenith layers comprising thread means and being arranged radially inwardly of said tread strip while extending over the width of said tread strip. At least one of the said zenith layers is located between the two reinforcing insert layers of a group of reinforcing insert layers, the thread means of those reinforcing insert layers which pertain to one and the same group having all of their thread portions within the tread strip area extending at substantially the same acute angle with regard to the circumferential direction of the tire whereas the thread means of said zenith layers describe opposite acute angles with the circumferential direction of the tire.

INVENTORS
HANS MENELL
GÜNTER JOHANNES
BY

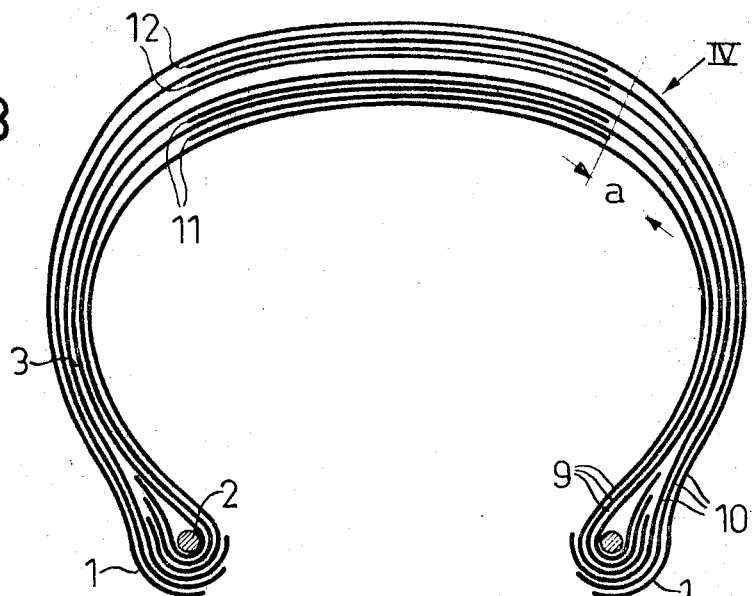
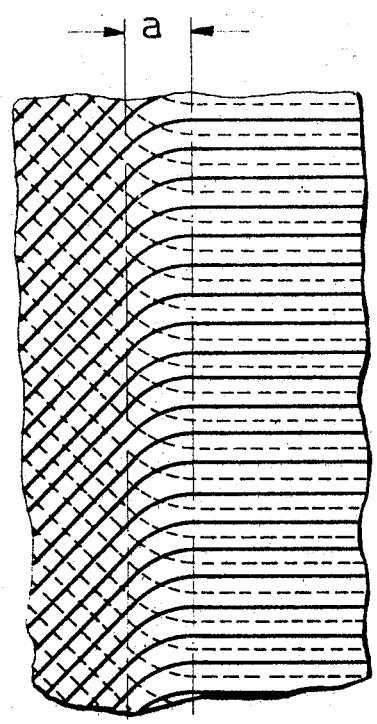
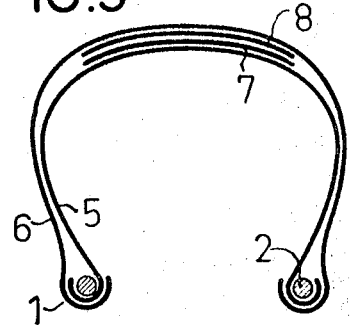
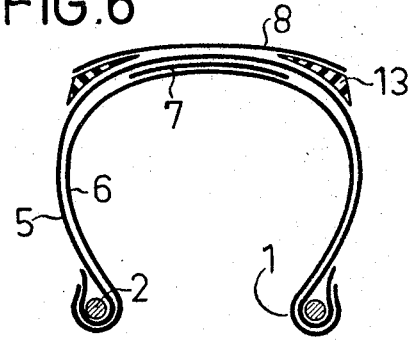

PNEUMATIC VEHICLE TIRE

The present invention relates to a pneumatic vehicle tire with parallel threads, wires, cords, or the like forming reinforcing inserts, in which said threads or the like extend in an uninterrupted manner from bead to bead and in the tire side walls extend at a right angle or substantially right angle with regard to the circumferential direction of the tire, whereas within the tread strip zone the said threads or the like form acute angles, preferably angles of from 5 to 30° with the circumferential direction of the tire. Additionally, within the tread strip zone there is or are provided one or more zenith layer or layers extending substantially over the width of the tread strip.

With heretofore known pneumatic tires of the above mentioned type, the reinforcing inserts comprising pairs of layers pertaining to each other have their threads or the like extend in a continuous manner from bead to bead in such a way that the threads or the like cross each other within the tread strip zone. While such an arrangement has the advantage that a cross-connection is formed in the tire zenith portion, this arrangement is disadvantageous in that the resistance against bursting in the tire zenith portion is considerably less than in the tire side walls, which latter have their threads or the like extend at a right angle or approximately right angle with regard to the circumferential direction of the tire.

It is also known to arrange additional reinforcing threads in the tire zenith portion. These last-mentioned reinforcing threads extend in the circumferential direction of the tire but do not contribute to an increase in the transverse strength of the tire strip zone or an increase in the resistance to bursting due to pressure.

It is, therefore, an object of the present invention to provide a pneumatic vehicle tire of the above general character which will have an increased resistance against bursting due to pressure.

It is another object of this invention to provide a tire as set forth in the preceding paragraph which will simplify the manufacture of the tire.

These and other objects and advantages of the invention will appear more clearly from the following specification in connection with the accompanying drawings, in which:

FIG. 3 is a diagrammatic radial partial section through a giant tire;

FIG. 4 shows the arrangement of the reinforcing inserts according to FIG. 3 within the range of a tire shoulder, as seen in the direction of the arrow IV;

FIG. 5 is a diagrammatic illustration of a radial partial section through a pneumatic tire, which is somewhat modified over that of FIG. 1; and FIG. 6 is a diagrammatic partial section through a pneumatic tire with a special design for the shoulder portions.

Figure 1:
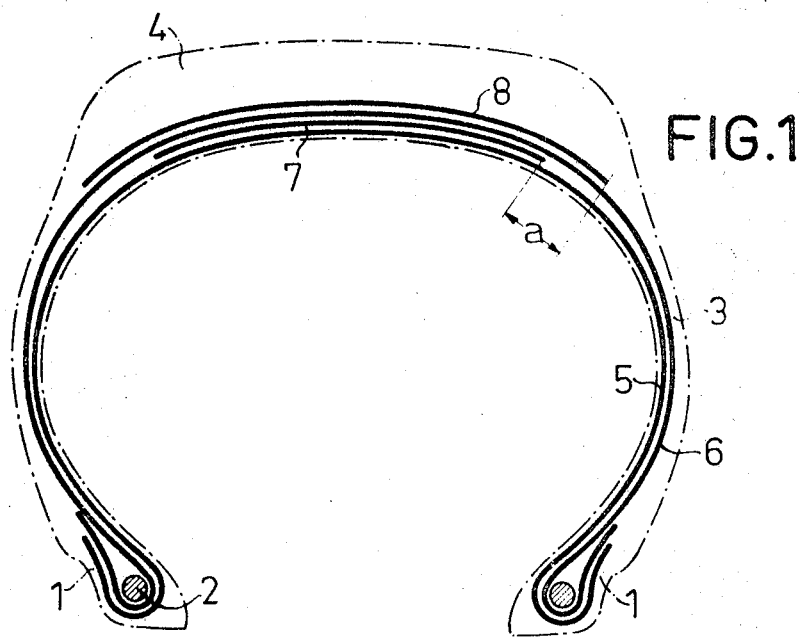
FIG. 1 is a diagrammatic radial partial section through a pneumatic tire according to the present invention for passenger cars.

The pneumatic vehicle tire according to the present invention with reinforcing inserts of parallel threads or the like which extend in uninterrupted manner from bead to bead and in which the threads in the tire side walls extend substantially at a right angle to the circumferential direction of the tire, whereas the threads in the tread strip zone extend at an acute angle with regard to the tire circumferential direction while additionally, one or more zenith layers are provided within the tread strip zone and extend substantially over the width of the tread strip, is characterized primarily in that the zenith layers are arranged between two reinforcing inserts, and that the threads or the like of the pairs of reinforcing insert layers pertaining to each other all extend in one inclined direction within the tread strip zone, whereas the threads or the like of the zenith layers form opposite acute angles with the circumferential direction of the tire.

Also with this tire design, a cross-connection is obtained within the tread strip zone. However, this cross-connection is with regard to one inclined direction formed by the threads or the like extending from bead to bead, whereas the threads of the other inclined direction are those of the zenith layers.

In view of the employment of the zenith layers, a considerably increased pressure burst resistance is obtained so that the latter will within the tread strip zone practically correspond to the pressure burst resistance in the tire side walls. At the same time, the tire manufacturing process is facilitated due to the fact that the reinforcing inserts which pertain to each other and form a pair can, during the build-up of the tire by a later angling or bending-off, be made of such cord fabric layers in which all threads extend in one inclined direction. These cord fabric layers can be processed together so that all threads or the like can in one working step be transformed from the stretched form into the approximately Z-shaped form. In other words, it is no longer necessary to individually process or deform the individual layers.

The above-mentioned zenith layers may have different widths. If the tire reinforcement consists of a reinforcing insert pair, one or more zenith layers may be provided and arranged between the reinforcing insert pair and the tread strips in such a way that the marginal portions of the zenith layers will within the range of the tire shoulders overlap the angled or bent-off portion or portions of the threads or the like extending from bead to bead. This will result in a fixing of the merging zone of the said reinforcing inserts which, even though they are arranged with two superimposed layers, have threads extending in the same direction.

Referring now to the drawings in detail, it will be noted that with all embodiments shown therein the arming or reinforcement of the pneumatic tire consists, in a manner known per se, of rubberized parallel pull-resistant threads, bands, cords, wires, or the like which are firmly embedded in and adhere to the tire body made of rubber or the like. The arming of the pneumatic tire furthermore comprises two types.

a. The reinforcing inserts:

The threads or the like forming the reinforcing inserts extend in a continuous manner from one tire bead 1 to the other tire bead 1 and, while being looped around the bead cores 2 are anchored thereto. Within the tire side walls 3, the threads or the like of the reinforcing inserts extend at right angle or practically a right angle with regard to the circumferential direction of the tire. Approximately within the zone of the tire shoulders, and more specifically, within the area a, the threads or the like are bent off and below the tread strip 4 describe angles of from 5 to 30° with the circumferential direction of the tire. Within the oppositely located tire shoulder, the threads or the like are again bent off and extend through the oppositely located tire side wall 3 approximately radially. The threads or the like below the tread strip 4 are straight.

b. Zenith layers:

These layers which likewise consist of pull-resistant threads, wires, and the like extend substantially over the width of the tread strip 4 and in their turn describe angles of from 5 to 30° with the circumferential direction of the tire.

Referring more specifically to FIG. 1, the tire shown therein comprises two reinforcing inserts 5, 6 and two zenith layers 7, 8. The zenith layer 7 is arranged between the two reinforcing inserts 5, 6. The zenith layer 8 is provided above the reinforcing insert 6.

Figure 2:
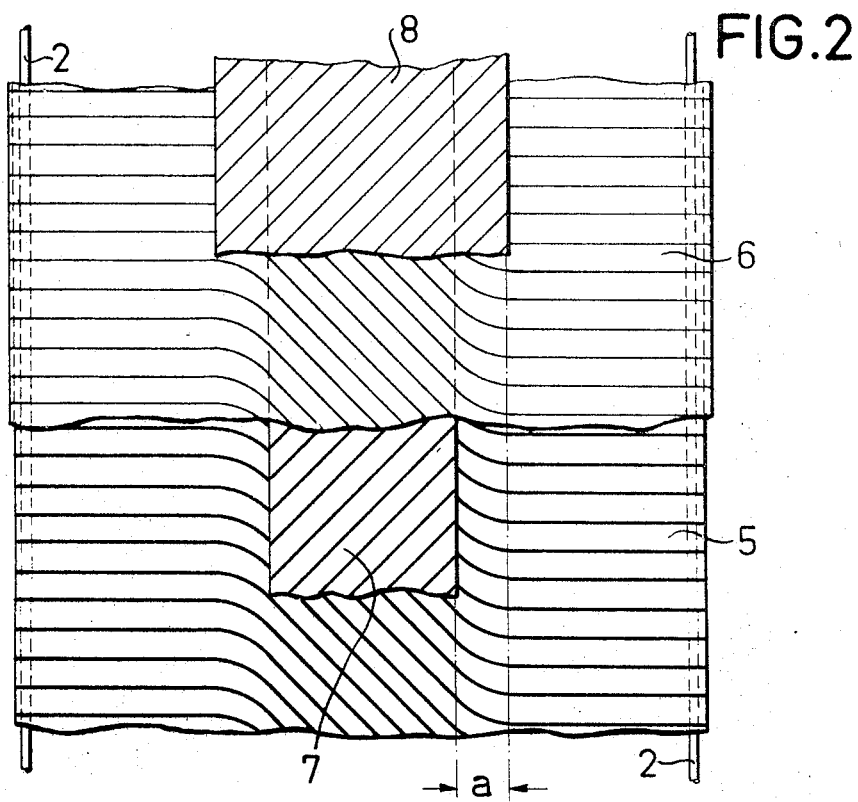
FIG. 2 is a top view of the reinforcement of the tire according to FIG. 1, said top view, for purposes of a simplified illustration, showing the layers as being located in one plane.

As will be evident from FIG. 2, the threads or the like of the zenith layers 7, 8 are parallel to each other but are oppositely inclined with regard to the adjacent thread sections of the reinforcing inserts 5, 6 so that within the zenith portion of the tire there is formed a cross-connection composed of four layers. The zenith layer 7 extends approximately to the marginal edge of the area a, whereas the top cover forming zenith layer 8 is so wide that it overlaps the area a at both sides of the tire. As a result of this overlapping, the bent-off portions formed by the reinforcing inserts 5, 6 are prevented from becoming deformed in an undesired manner. Thus, the employment of the zenith layers 7, 8 brings about a considerable increase in the resistance to burst or in the burst strength. Also, below the tread strip 4 a strength is obtained in transverse direction which corresponds to the transverse strength of the walls 3. The design of the reinforcing inserts 5, 6 with the threads parallel or practically parallel to each other in all areas, brings about the above-mentioned manufacturing advantages inasmuch as two bias-cut cord fabric layers may form the starting layers for the two reinforcing inserts 5, 6 which reinforcing layers 5, 6 after interposing the zenith layer 7, may be deformed therewith together, and more specifically, for forming the approximately Z-shaped course of the threads, or the like.

The present invention does not exclude the employment of four or more reinforcing inserts, in which instance each two superimposed reinforcing inserts may have one or, if desired a plurality of zenith layers associated therewith with the above-mentioned course of the threads, or the like. In this connection, however, it is advantageous so to arrange a part — at least two — of the reinforcing inserts that the threads or the like thereof extend in the zenith portion of the tire in one inclined direction, whereas the threads or the like of the remaining reinforcing inserts extend in the opposite inclined direction below the tread strip. This design and arrangement of the reinforcing inserts extending from bead to bead has the advantage that a cross connection is formed not only directly below the tread strip but also within merging zones within the area of the tire shoulders. This design of the doubling of the reinforcing inserts is of importance primarily with relatively large tires as they are used, for instance, for large trucks. Also in these instances the width of the zenith layers may be reduced. The zenith layers may thus extend over a width which is less than the width of the tread strip. An example for an arrangement just described is shown in FIG. 3 illustrating a giant tire with a total of six reinforcing inserts. Of these six reinforcing inserts, the inner reinforcing inserts 9 are placed in the manner similar to the reinforcing inserts 5, 6 of FIGS. 1, 2 whereas the three outer reinforcing inserts 10, while likewise comprising substantially Z-shaped threads or the like, have an inclined position in the thread sections below the thread strip 4, the direction of such inclination being opposite to that of the adjacent thread sections of the reinforcing inserts 9. Also with this embodiment, the two groups of reinforcing inserts 9, 10 respectively, have respectively associated therewith zenith layers 11, 12. These zenith layers are located between adjacent reinforcing inserts 9, 10 respectively and in addition are equipped with threads the inclined location of which is opposite to that of the adjacent reinforcing inserts 9, 10.

The sections $a$ which are likewise formed with this type design comprise threads or thread reinforcing inserts 9, 10 which cross each other in conformity with FIG. 4. In view of the opposite inclination of the reinforcing inserts 9, 10 respectively, also within the areas $a$, a cross-connection is assured for locking the threads. It is, therefore, not necessary to employ zenith layers 11, 12 extending into the area $a$. An overlapping of the areas $a$ by the zenith layers 11, 12 would, with the plurality of reinforcing inserts 9, 10 result in too great a stiffness of the shoulder areas of the tire.

According to FIG. 5, the two zenith layers 7, 8 are arranged between the two reinforcing inserts 5, 6, whereas with the embodiment according to FIG. 6 a thread layout according to FIGS. 1 and 2 is employed but with the difference that in addition thereto an approximately triangular rubber strip 13 is arranged between the marginal areas of the zenith layer 8 and the reinforcing insert 6. This rubber strip represents a gradual power transfer and will prevent the thread or the like from becoming detached. In view of the triangular cross-section of the rubber strip, the latter has its greatest thickness at the marginal areas of the zenith layers and will there permit its maximum elastic deformation. In view of the fact that the wall thickness diminishes toward the tire center, the elastic deformation will increase in this direction accordingly.

It is, of course, to be understood that the present invention is, by no means, limited to the particular embodiment shown in the drawings, but also comprises any modifications within the scope of the invention.

It is also to be understood that the term Thread Means as it occurs in the claims not only covers threads, but also cords, wires and similar elements customarily used as strength carriers in carcasses of pneumatic tires.

We claim:

1. A pneumatic vehicle tire with a tread strip and with side walls each having a bead core, which includes: at least one group of two reinforcing insert layers in superimposed relationship to each other and comprising strength carrying means in the form of parallel thread means extending from bead core to bead core through said side walls and radially inside of said tread strip, those portions of said thread means which pass through said side walls extending at approximately a right angle with regard to the circumferential direction of the tire, and those portions of said thread means which extend within the tread strip area radially inwardly of said tread strip forming an acute angle with the circumferential direction of the tire, and a plurality of zenith layers comprising thread means and being arranged radially inwardly of said tread strip while extending over the width of said tread strip, at least one of said zenith layers being located with all threads slanting directionally between the two reinforcing insert layers of a group of reinforcing insert layers, the thread means of those reinforcing insert layers which pertain to one and the same group having all of their thread portions within the tread strip area extending at substantially the same acute angle with regard to the circumferential direction of the tire, whereas the thread means of said zenith layers describe opposite acute angles with the circumferential direction of the tire.

2. A vehicle tire according to claim 1, in which those thread portions of the thread means pertaining to the reinforcing insert layers and located in the tread strip area particularly extend at an angle of from 5 to 30° of slanted thread direction with regard to the circumferential direction of the tire.

3. A vehicle tire according to claim 1, in which that portion of the outer reinforcing insert layer which is located adjacent said tread strip is surrounded by at least one zenith layer the marginal portions of which cover that area of the reinforcing insert layers by which the thread portions pertaining to the insert layers and located in said side walls merge with those thread portions of said reinforcing insert layers which cross each other and are located radially inwardly of said tread strip.

4. A vehicle tire according to claim 1, which includes at least two groups of reinforcing insert layers having sections of their thread means respectively crossing each other.

5. A vehicle tire according to claim 4, in which the thread means of said reinforcing insert layers cross each other at the area where the thread means portions pertaining to said reinforcing insert layers and located in said side walls merge with the thread means portions pertaining to the same reinforcing insert layers and being located radially inwardly of said tread strip within the thread strip zone.

6. A vehicle tire according to claim 5, in which said zenith layers extend only to said merging area.

7. A vehicle tire according to claim 1, which includes annular rubber strips located between the marginal areas of an outer zenith layer and the adjacent intermediate merging portion of an outer reinforcing insert layer.

8. A vehicle tire according to claim 7, in which said annular rubber strips specifically have an approximately triangular cross-section.